United States Patent [19]

Absil et al.

[11] Patent Number: 5,232,579
[45] Date of Patent: Aug. 3, 1993

[54] CATALYTIC CRACKING PROCESS UTILIZING A ZEOLITE BETA CATALYST SYNTHESIZED WITH A CHELATING AGENT

[75] Inventors: Robert P. L. Absil, Mantua; Joseph A. Herbst, Turnersville; Jocelyn A. Kowalski, Clarksboro, all of N.J.; Mae K. Rubin, Bala Cynwyd, Pa.

[73] Assignee: Mobil Oil Corporation, Fairfax, Va.

[21] Appl. No.: 715,189

[22] Filed: Jun. 14, 1991

[51] Int. Cl.$^5$ .................. C10G 11/02; C10G 11/04
[52] U.S. Cl. ........................... 208/113; 208/118; 208/119
[58] Field of Search ................. 208/113, 118, 119

[56] References Cited

U.S. PATENT DOCUMENTS

| Re. 28,341 | 2/1975 | Wadlinger et al. | 208/120 |
|---|---|---|---|
| 3,308,069 | 3/1967 | Wadlinger et al. | 252/455 |
| 3,442,795 | 5/1969 | Kerr et al. | 208/120 |
| 4,093,560 | 6/1978 | Kerr et al. | 252/455 |
| 4,341,748 | 7/1982 | Plank et al. | 423/328 C |
| 4,377,502 | 3/1983 | Klotz | 252/455 |
| 4,419,220 | 12/1983 | LaPierre et al. | 208/111 |
| 4,423,266 | 12/1983 | Young | 585/481 |
| 4,456,780 | 6/1984 | Young | 585/475 |
| 4,517,402 | 5/1985 | Dessau | 585/820 |
| 4,560,542 | 12/1985 | Robson | 423/328 |
| 4,642,226 | 2/1987 | Calvert et al. | 423/328 |
| 4,650,656 | 3/1987 | Dwyer et al. | 423/329 |
| 4,740,292 | 4/1988 | Chen et al. | 208/120 |
| 4,828,679 | 5/1989 | Cormier, Jr. et al. | 208/120 |
| 4,911,823 | 3/1990 | Chen et al. | 208/67 |
| 4,923,690 | 5/1990 | Valyocsik et al. | 423/328 |
| 4,983,275 | 1/1991 | McWilliams et al. | 208/111 |

FOREIGN PATENT DOCUMENTS

0002900 7/1979 European Pat. Off. .

OTHER PUBLICATIONS

Morris et al., *Zeolites*, vol. 11, pp. 178-183 (1991).
Charnell, J. F. *Crystal Growth*, vol. 3, pp. 291-294 (1971).
M. A. Camblor et al, *Zeolites*, vol. 11, pp. 202-210 (1991).
"Optimization of zeolite-$\beta$ in cracking catalysts Influence of crystallite size", L. Bonetto et al., *Applied Catalysis A:General*, 82 (1992) pp. 37-50; Elsevier Science Publishers B.V., Amsterdam.

*Primary Examiner*—Theodore Morris
*Assistant Examiner*—Walter D. Griffin
*Attorney, Agent, or Firm*—Alexander J. McKillop; Malcolm D. Keen; Jessica M. Sinnott

[57] ABSTRACT

A catalytic cracking process for converting a hydrocarbon fraction, preferably boiling in the range of a heavy gas oil, is disclosed in which the cracking catalyst is a large crystal fully crystalline zeolite Beta having a broad range of silica-to-alumina mole ratios, i.e. 20->1000. The zeolite Beta catalyst is synthesized with a nitrogenous organic chelating agent, such as a tertiary alkanolamine, preferably triethanolamine, in the synthesis mixture along with at least one source of organic directing agent such as tetraethylammonium hydroxide, tetraethylammonium bromide and tetraethylammonium fluoride. The zeolite Beta can be used as a stand alone catalyst or an additive catalyst for hydrocarbon cracking reactions along with another molecular seive type catalyst such as a faujasite catalyst or ZSM-5. The large crystal zeolite Beta can also be treated with a source of phosphorus to enhance the properties of the zeolite.

39 Claims, No Drawings

CATALYTIC CRACKING PROCESS UTILIZING A ZEOLITE BETA CATALYST SYNTHESIZED WITH A CHELATING AGENT

CROSS REFERENCE TO RELATED APPLICATIONS

Reference is made to U.S. patent application Ser. No. 07/715,190, filed on Jun. 14, 1991, U.S. Pat. No. 5,164,169 entitled "Zeolite Beta". Cross Reference is also made to U.S. patent application Ser. No. 07/715,270, U.S. Pat. No. 5,164,170 filed on Jun. 14, 1991. Both applications are incorporated herein by reference.

FIELD OF THE INVENTION

This invention relates to a catalytic cracking process using a zeolite Beta catalyst. More particularly, the invention relates to a cracking process utilizing a zeolite Beta catalyst in which a chelating agent is incorporated into the zeolite synthesis mixture.

BACKGROUND OF THE INVENTION

Catalytic cracking of hydrocarbon oils over crystalline silicate catalysts is well known for the efficient conversion of hydrocarbons into useful and very valuable products including high octane gasoline, cycle oil and olefins. The cracking processes are basically conducted in a fluid bed catalytic cracking unit (FCC) or a thermofor catalytic cracking reactor (TCC). In general, TCC is a continuous process using a moving bed of solid catalyst in bead form which flow through the reactor where cracking takes place and then is taken to a kiln where coke deposits from the cracking reactions are burned off. In the FCC unit a solid catalyst in the form of a fine powder is cycled between a reactor and a regenerator. Vaporous hydrocarbons which are bubbled through the powdered catalyst make the catalyst flow like a liquid.

The spectrum of products produced by catalytic cracking is broad both in terms of molecular weight and chemical class. For example, a heavy gas oil will yield $C_5+ - 400°$ F. gasoline as a major product, light fuel oil, heavy fuel oil, $C_4$'s, $C_3$-gas and coke. Only limited quantities of the light hydrocarbons can be used in gasoline because of their high vapor pressure. However, the light olefins produced by cracking are important products because they can be upgraded by various light olefin upgrading processes.

The light olefins are useful as a feed for methyl-tert-butyl-ether (MTBE) and tert-amyl-methyl ether (TAME) synthesis and alkylation processes which lead to an overall increase in the refinery gasoline pool.

Additionally, new laws which mandate a higher content of oxygenated compounds in gasoline require refiners to maximize refinery output of light olefins. The light olefins, isobutylenes and isoamylenes, used to produce (MTBE) and (TAME), are the oxygenated gasoline blending components of choice for reformulated gasolines. A proper formulation of catalyst composition and cracking operation conditions can significantly effect the light olefins output. Furthermore, the use of MTBE and TAME as gasoline additives imparts excellent octane gain to both premium and regular gasoline blends.

Additionally, the low molecular weight products can be used to produce high octane blending components to improve the refinery gasoline yield. The low molecular weight products of catalytic cracking can be used to make the highly branched paraffins which have good octane properties by a building-up process known as paraffin alkylation, or, simply, alkylation. The motor octane rating of the products from alkylating the isobutane with the propylene, butylene, and amylene light products of cracking reactions are very good, i.e., 89, 93 and 90, respectively.

Moreover, government regulations which mandate stringent gasoline specifications increase the importance of production of alkylate gasoline. In addition to the enhanced octane, alkylate can help reduce vehicle emissions as the components in the alkylate do not contribute to ozone formation. Also, alkylate has low vapor pressure which allows refiners to maintain government mandated volatility specifications. See L. F. Albright, "Alkylation will be Key Process in Reformulated Gasoline Era", *Oil & Gas Journal*, Nov. 12, 1990, pp. 79-92.

The types of catalysts chosen for use in cracking reactions can influence the efficiency of the process and can effect the product distribution.

Crystalline zeolites, both natural and synthetic, are particularly effective for catalytic cracking reactions. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties. Such molecular sieves, both natural and synthetic, include a wide variety of positive ion-containing crystalline silicates. These silicates can be described as rigid three-dimensional frameworks of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, e.g., an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing conventional ion exchange techniques. By means of cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat.

No. 3,972,983); zeolite ZSM-35 (U.S. Pat. No. 4,016,245); and zeolite ZSM-23 (U.S. Pat. No. 4,076,842), to name a mere few.

The $SiO_2/Al_2O_3$ ratio of a given zeolite is often variable. For example, zeolite X can be synthesized with SiO ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicates of varying alumina and metal content. Varying the silica-to-alumina ratio has been demonstrated to influence the range and distribution of products of catalytic cracking.

Zeolite Beta is a known zeolite which is described in U.S. Pat. Nos. 3,308,069 and RE 28,341 both to Wadlinger, and reference is made to these patents for a general description of zeolite Beta. The zeolite Beta of Wadlinger is described as having a silica-to-alumina ratio of 10 to 100 and possibly as high as 150.

A catalyst system incorporating zeolite Beta as an additive catalyst along with a faujasite catalyst is described in U.S. Pat. No. 4,740,292 as being effective for upgrading the total yield and octane number of the gasoline product. The higher silica zeolite Beta is described as performing well in the conversion processes (i.e. silica-to-alumina ratio above 200:1).

A highly silicious zeolite Beta made by direct synthesis is described in U.S. Pat. No. 4,923,690 to Valyocsik; however, to achieve high silica-to-alumina ratios the zeolite is only partially crystalline. Thus, as described in the patent, when the crystallinity of the zeolite increases, the silica-to-alumina ratio decreases. For purposes of catalytic cracking, it would be desirable to have a fully crystalline zeolite in which the silicate is free of amorphous materials.

The description of the zeolite Beta synthesized by Wadlinger is silent as to the crystallite size. Typically, however, the zeolite Beta produced by the Wadlinger method is a small crystal having a crystal size ranging from 0.01 to 0.05 microns. Large crystal zeolites have been found to possess distinct advantages in certain hydrocarbon conversion processes over the smaller crystal zeolites.

Larger crystal zeolites are known to provide longer diffusion path lengths which can be used to modify catalytic reactions. By way of illustration only, in the medium pore zeolite ZSM-5, manipulating crystal size in order to change the selectivity of the catalyst has been described. A unique shape selective characteristic of ZSM-5 is the para-selectivity in toluene disproportionation and aromatics alkylation reactions. Increasing the size of the crystal, thereby lengthening the diffusion path, is just one way of achieving a high para-selectivity. The product selectivity occurs because an increase in the diffusion constraints is imposed on the bulkier, slower diffusing o- and m- isomers which reduces the production of these isomers and increases the yield of the para-isomer. N.Y. Chen et al, *Shape Selective Catalysis in Industrial Applications*, p.p. 51 (Marcel Dekker, Inc New York 1989) and N.Y. Chen et al, *Industrial Application of Shape Selective Catalysts*, p.p. 196 (Catal. Rev. Sci. Eng. 28 (2&3) 1986). Obtaining high selectivities in zeolite ZSM-5 by increasing the crystal size is described in U.S. Pat. No. 4,517,402 which is incorporated herein by reference. In U.S. Pat. No. 4,828,679 it is revealed that large crystal ZSM-5 type zeolites have improved octane gain and total motor fuel yield as well as improved steam stability. U.S. Pat. No. 4,650,656 describes a large crystal ZSM-5 which is synthesized by controlling the reaction conditions such as the rate of addition of the organics, the temperature, pH and the degree of agitation of the crystallization media. The application of an external gravitational force during the synthesis of silicalite has been described as a means for producing a large crystal zeolite in D. T. Hayhurst et al, "Effect of Gravity on Silicalite Crystallization" in *Zeolite Synthesis* p.p. 233 (M. L. Occelli Ed. American Chemical Society 1956). In J. F. Charnell, "Gel Growth of Large Crystals of Sodium A and Sodium X Zeolites", *Jour. Crystal Growth* 8, pp. 291–294, (North Holland Publishing Co., 1971), a method of synthesizing large crystal zeolite A and zeolite X is described in which, as the only organic reactant, triethanolamine is incorporated into the reaction mixture. A review of these publications reveals that a significant amount of attention has been directed to synthesizing large crystal zeolites yet none of the publications point to a consistent method for producing the large crystals. The crystal size of zeolite Beta was generally related to the silica-to-alumina mole ratio, the highly silicious zeolite Beta corresponding to a larger crystal size and the lower silica-to-alumina mole ratio corresponding to a smaller crystal size. Techniques for synthesizing a large crystal zeolite Beta covering a broad range of silica-to-alumina ratios, including the high as well as the low silica-to-alumina ratios, would be desirable and the advantages would be appreciated in hydrocarbon conversion processes.

SUMMARY OF THE INVENTION

In accordance with the invention it was discovered that a zeolite Beta catalyst synthesized with a chelating agent has physical characteristics and properties which are advantageous in hydrocarbon conversion processes. The zeolite Beta is highly crystalline, can be synthesized over a broad range of silica-to-alumina ratios and in a large crystal size and has been found to produce desirable results in catalytic cracking reactions.

DETAILED DESCRIPTION OF THE INVENTION

The hydrocarbon conversion process of the invention utilizes a fully crystalline large crystal zeolite Beta catalyst which is made from a synthesis mixture containing one or more sources of alkali metal cations, organic nitrogen-containing cations, oxides of aluminum, oxides of silicon, chelating agent and water and has a composition, in terms of mole ratios, within the ranges recited in the following Table A:

TABLE A

|  |  | Broad | Preferred |
|---|---|---|---|
| $SiO_2/Al_2O_3$ | = | 20–>1000 | 70–1000 |
| $OH^-/SiO_2$ | = | 0.1–0.8 | 0.2–0.4 |
| $R/SiO_2$ | = | 0.3–1.0 | 0.3–0.9 |
| $H_2O/SiO_2$ | = | 5–40 | 5–15 |
| $M/SiO_2$ | = | 0.01–0.2 | 0.01–0.07 |
| $X/SiO_2$ | = | 0.1–1.0 | 0.2–0.8 |
| $R_1/R_1 + R_2$ | = | 0.1–1.0 | 0.2–0.8 |

R = organic nitrogen-containing cation;

$R_1$ = tetraethylammonium hydroxide;
$R_2$ = tetraethylammonium halide;
M = alkali metal cation; and
X = a chelating agent.

The mixture is maintained under conditions sufficient to chelating agent is critical, since it complexes with alumina facilitating synthesis of a large crystal fully crystalline zeolite Beta having a broad range of silica-to-alumina ratios.

The zeolite Beta is highly crystalline which means that the zeolite Beta is substantially free of amorphous silica and alumina unlike the partially crystalline zeolite Beta of U.S. Pat. No. 4,923,690. In order to achieve complete crystallization the synthesis should be carried out until the product is at least about 70% crystalline, ranging from 80% to 130% crystalline, preferably at least about 90% crystalline as determined by traditional X-ray analysis techniques.

The reaction mixture for the synthesis of fully crystalline zeolite Beta can be prepared utilizing materials which supply the appropriate oxide. Such compositions include aluminates, alumina, precipitated silica, silica hydrosol, silica gel, silica precurser, silicic acid and hydroxides. Each oxide component utilized in the reaction mixture for preparing the zeolite can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or salt, e.g. halide, such as chloride, iodide, fluoride or bromide. The reaction mixture can be prepared either batchwise or continuously.

The zeolite Beta can also be synthesized in the absence of other sources of zeolite framework elements such as aluminum. Thus, the zeolite synthesis mixture will be substantially free of added alumina or alumina source. However, alumina may be present in the synthesis mixture as an impurity in the starting materials in amounts of less than 0.6 wt.%, preferably less than 0.2 wt.%.

The organic reactants include at least one organic directing agent which is an organic nitrogen-containing cation and a chelating agent.

The directing agent for the synthesis of zeolite Beta is at least one tetraethylammonium compound or mixtures thereof: non-limiting examples include the hydroxide and/or the halide, e.g., tetraethylammonium hydroxide (TEAOH), tetraethylammonium bromide (TEABr), tetraethylammonium chloride (TEACl) and tetraethylammonium fluoride (TEAF) and mixtures thereof.

The chelating agent is an organic nitrogenous compound such as a tertiary alkanolamine, i.e., triethanolamine (TEA). Other possible tertiary alkanolamines which may be suitable in the instant process are represented by triisopropanolamine, 2,2-Bis(hydroxymethyl)-2,2'2''-nitrilotriethanol. Triethanolamine is described in *Hawley's Condensed Chemical Dictionary*, pp. 1179-1180, N.I. Sax et al., 11 ed. (Van Nostrand Reinhold Co., N.Y. 1987) which is incorporated herein by reference as to that description.

The chelating agent allows a high silica content starting material, such as a precipitated silica, to be utilized in synthesizing the highly silicious zeolite Beta. The chelating agent helps to fluidize the high silica-content mixture which facilitates stirring or agitating the mixture during formation of the zeolite.

The chelating agent also allows less water to be used in the synthesis mixture, i.e. $H_2O/SiO_2$, ranging from 5 to 10, which favors formation of the pure, fully crystalline material. Excess water is undesirable because it results in the formation of an impure product which contains materials other than zeolite Beta, such as ZSM-12. Although extra tetraethylammonium hydroxide can be used to supply adequate fluidity, it is not an economical alternative and does not produce the fully crystalline large crystals.

The zeolite Beta composition as prepared hereby can be identified, in terms of mole ratios of oxides and in the as-synthesized anhydrous state, as follows: (3 to 60)$R_2O$:(0.5 to 12)$M_{2/n}O$:$Al_2O_3$:(20 to >1000)$SiO_2$ where M is the alkali metal cation of valence n an R represents the organic cations. The term organic cation is used here to include the organic directing agent and the chelating agent.

The zeolite Beta synthesized in accordance with the method described herein is considered a large crystal having a crystal size of at least 0.1 to 0.2 microns and ranging from 0.2 to 3.0 microns, more specifically from 0.2 to 2.0 microns. This is a significant advance in magnitude over the smaller crystal zeolite Beta which are characterized by a range in crystal size from 0.02 to 0.05 microns.

The determination of crystal size, is described in more complete detail in U.S. Pat. No. 4,828,679 which is incorporated herein by reference. Basically, crystal size is determined by conventional scanning electron microscopy (SEM) or transmission electron microscopy (TEM). The minimum crystal size of a given crystal is taken as the dimension of a reference. The amount of large crystal zeolite Beta synthesized in accordance with this invention is present in predominant proportions; i.e., exceeding 50 wt. % and preferably may constitute up to 100 wt.% of the total zeolite synthesized.

In synthesizing the highly silicious zeolite which is defined as such by having silica-to-alumina ratios over 100, preferably ranging from 200 to >1000, an amorphous precipitated silica or silica precursor can be the silica source. The precipitated silicas exhibit low viscosities even at high solids content in the synthesis mixture and have solids (silica) content of at least about 10 wt.%, preferably from 30 to 90 wt.%. Precipitated silica is formed from the vapor phase or by precipitation from solution such as sodium silicate solution. The process is described in more complete detail in Kirk-Othmer's "Encyclopedia of Chemical Technology", 3rd Ed., Vol. 20, pp. 776 (John Wiley & Sons, 1982) which is incorporated herein by reference. The precipitated silica may range in particle size from 0.01 to 100 microns, preferably having a size of about 0.02 microns. The advantage of using a precipitated silica is that the reaction mixture has a higher solids content, greater than about 10 wt.% by weight which effects a cost reduction. Representative examples of the commercially available precipitated silicas include the solid silica, Ultrasil (a precipitated, spray dried silica containing 90 wt. % silica), HiSil (a precipitated hydrated silica containing about 87 wt.% silica) and RTM.

A silica source which can also be used as the source for silica is an amorphous silica precipitate made from a solution of soluble silica source which is called silica precursor. The silica precursor is described in U.S. Pat. No. 4,893,275 and the description of the silica sources are incorporated herein by reference.

In preparing the highly silicious zeolites using a precipitated silica, special starter seeds are included in the reaction mixture. The special seeds are preferably highly silicious e.g., having a silica-to-alumina mole ratio of at least 70 and high purity zeolite Beta. Low silica seeds are undesirable as they tend to promote formation of a product containing impurities such as ZSM-12 or ZSM-5. The reaction mixture for the special seeds comprises sources of alkali metal cations, oxides of aluminum, oxides of silicon and at least one organic directing agent and water. The special starter seeds may or may not contain added alumina. Thus, in the high silica seed reaction mixture any alumina contained in the synthesis mixture exists as an impurity. The mixture can, optionally contain the chelating agent. The final zeolite Beta product can also be "self-seeding" which means that the reaction synthesis for the starter seeds is almost identical to the reaction synthesis for the final product.

The silica-to-alumina ratios referred to herein are the framework ratios. Thus, as known in the art, the ratio of the $SiO_4$ to the $AlO_4$ tetrahedra make up the structure of the zeolite Beta. The ratio may vary from the ratio determined by various known physical and chemical methods which are described more completely in U.S. Pat. No. 4,419,220 which is incorporated herein by reference.

Crystallization of the material can be carried out at either static or stirred conditions. The agitation can vary from about 0 to 400 rpms, in a suitable reactor vessel. Suitable vessels include polypropylene, teflon coated or stainless steel autoclaves. The range of temperatures necessary to fully crystallize the zeolite Beta range from about 70° C. to 175° C., preferably 140° C. The amount of time required for crystallization ranges from about at least 16 hours to 90 days. Thereafter, the crystals are recovered.

The hydrogen form of the zeolite can be prepared by calcining in air in an inert atmosphere at a temperature ranging from 200° C. to 900° C. or higher and exchange of the alkali metal cation.

The original cation can be replaced, at least in part, by clacination and/or ion exchange with another cation. Thus, the original cations are exchanged into a hydrogen or hydrogen ion precursor form or a form in which the original cation has been replaced by a metal of Groups IIA, IIIA, IVA, IIIB, IVB, VIB, VIIB or VIII of the Periodic Table of the Elements. Thus, for example, the original cations can be exchanged with ammonium cations or hydronium ions. Catalytically active forms of these would include, in particular, hydrogen, rare earth metals, aluminum metals of Groups II and VII of the Periodic Table and manganese. The original cation can be replaced by methods which include ion exchange, impregnation or by physical admixture.

The X-ray diffraction patterns of the crystalline silicate identified as zeolite Beta are shown in U.S. Pat. No. 3,308,069, herein incorporated by reference, in its entirety. The known methods of structural determination used to evaluate the instant zeolite Beta will be found there as well. The X-ray diffraction pattern of crystalline silicate having the structure of zeolite Beta made in accordance with the instant invention has the characteristic lines which fall within the ranges of the general zeolite Beta pattern.

Steaming, a known technique, can be used to increase the silica-to-alumina ratio even further. Steaming is conducted with 0.01 to 1.0 atm. of water in air at a temperature of at least 600° F., preferably at least about 650° F. for about 1 to 48 hours, preferably 3 to 24 hours. To increase the silica-to-alumina ratio still further the catalyst can be subjected to acid treatment with a mineral acid. This can be performed alone or along with the steam treatment. Such methods are described in further detail in U.S. Pat. No. 4,740,292 which is incorporated herein by reference, in its entirety.

The instant invention is directed to use of the zeolite Beta as a stand-alone catalyst or additive catalyst. That is, as an additive catalyst, the catalyst system will comprise the zeolite Beta and, for example, a cracking catalyst such as a faujasite type catalyst, representative examples of which include a Y-type zeolite, such as REY-, USY RE-USY, dealuminated Y and silicon-enriched dealuminated Y. The molecular seive catalyst can also be ZSM-5. For a more complete description of the use of a zeolite Beta as an additive catalyst, reference is made to U.S. Pat. No. 4,740,292 in which a faujasite-type zeolite and zeolite Beta are used in a mixture in a process of catalytic cracking.

It is often desirable to incorporate the zeolites into a material resistant to the temperature and conditions employed in the process. Such matrix materials include synthetic and naturally occurring substances, such as inorganic materials, e.g., clay, silica and metal oxides. The latter may be either naturally occurring or in the form of gelatinous precipitates or gels, including mixtures of silica and metal oxides. Naturally occurring clays can be composited with the zeolites, including those of the montmorillonite and Kaolin families. These clays can be used in the raw state as originally mined or initially subjected to calcination, acid treatment or chemical modification to enhance their activity. The relative proportions of zeolite component and inorganic oxide gel matrix on an anhydrous basis may vary widely with the zeolite content ranging from 5 to 80, more usually 10 to 70 wt.% of the dry composite. The matrix itself may possess catalytic properties, generally of an acidic nature.

In addition to the foregoing materials, the zeolite Beta catalyst can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components can also be used, The relative proportions of the crystalline silicate and inorganic oxide gel matrix may vary widely with the crystalline silicate content ranging from about 1 to 90 percent by weight, usually from about 2 to about 50 percent by weight of the composite.

Phosphorus Treatment

The zeolite Beta of the instant invention can be further improved for catalytic cracking applications by treatment with a source of phosphorus. Phosphorus treatment of the instant large crystal fully crystalline zeolite Beta improves the selectivity of the zeolite Beta. Treatment with phosphorus-containing compounds can readily be accomplished by contacting the catalyst with a solution of an appropriate phosphorus compound, followed by drying and calcining to convert the phosphorus to its oxide form.

In one embodiment of the invention, the method of phosphorus treatment of the zeolite Beta described herein includes adding a source of phosphorus, for example, phosphoric acid to a zeolite or a clay slurry.

The slurries can be mixed in any order, i.e., the zeolite slurry can be mixed with the phosphorus treated clay slurry or it can be treated with phosphorus and then mixed with the clay slurry. In any event the final slurry solids are adjusted to about at least 25 weight %. The pH of the slurry can also be adjusted as necessary in order to meet the pH requirements of the system. The pH of the system is adjusted to $\leq 3$, more preferably $\leq 2$. After thorough mixing, the slurry is then spray dried and, preferably, calcined for example at temperatures ranging from 400 to 1200° F. for about 1 minute to 48 hours to yield a catalyst having, for example, about 10 to 20% zeolite and about 70 to 85% clay and about 5 to 10 wt.% phosphorus (as $P_2O_5$).

In a preferred embodiment, the source of phosphorus, for example phosphoric acid is added to the clay slurry and the contact time between the clay slurry and the phosphorus is limited. Thus, phosphorus is added to the clay slurry for a short time period prior to mixing the clay/phosphorus slurry to the zeolite slurry. The time period is less than about 30 minutes, preferably less than 15 minutes before mixing the clay/phosphorus slurry with the zeolite slurry.

The catalysts made in accordance with this embodiment of the present invention are formed in the absence of the non-zeolite inorganic oxide matrices. This means that the catalyst excludes oxide matrices such as silica, alumina, silica-alumina, magnesia, boria, titania, zirconia and mixtures thereof. The catalyst matrix for this embodiment of the invention should not contain any added silica and/or alumina which is introduced as gels or sols.

Because of the low pH of the slurry, the zeolite Beta used should be acid stable at pH $\leq 3$, most preferably in the range of 1-2. As used herein the term acid stable means that the zeolite will undergo minimal removal of the framework components in the stated pH ranges. Appropriately, the zeolite Beta should have a silica-to-alumina ratio of greater than 15/1, preferably greater than 20/1 and most preferably greater than 30/1.

In another embodiment the first slurry comprises a zeolite, the second slurry comprises a first clay such as kaolin clay and the third slurry comprises a clay having a different average particle size than the first clay such as ball clay. The Kaolin clay has a particle size distribution of about 0.2 to 20 microns, most preferably about 1.0 microns to 10 microns while the ball clay typically has a particle size distribution of about 0.4 to 0.6 microns. A source of phosphorus is then added to one of the slurries.

According to this method, after the three slurries have been combined and any desired adjustments have been made to the solids percentage, the pH of the slurry mixture is adjusted to $\leq 3$ and most preferably to $\leq 2$. Satisfactory attrition resistances are obtained in the absence of calcination of the spray dried catalyst which results in a substantial reduction in catalyst manufacturing costs.

Suitable sources of phosphorus include phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite and mixtures thereof.

Catalyst Application

A specific catalytic application contemplated by the invention is FCC or TCC cracking of hydrocarbon feeds. Because both the TCC and FCC processes are well established, it is not necessary to describe the individual features in detail. However, it is worthwhile to point out that the FCC process is an endothermic catalytic cracking process which is operated at elevated temperatures, up to about 1200° F. and under slight superatmospheric pressure of up to about 50 psig. The catalyst passes continuously in a closed loop from the cracking reactor to the regenerator in which the coke which accumulates on the catalyst is removed oxidatively, both in order to restore activity to the catalyst and to supply heat for the endothermic cracking requirements.

The process is carried out under conditions similar to those used for conventional catalytic cracking. Process temperatures of up to about 1200° F. may conveniently be used, although temperatures above 1100° F. will normally not be employed. Generally, temperatures of 900° to 1100° F. will be employed. The catalyst-to-oil ratio is typically in a range of from 1:1 to 10:1, more preferably from 3:1 to 6:1, even more specifically about 5:1.

A preliminary hydrotreating step to remove nitrogen and sulfur and to saturate aromatics to naphthenes without substantial boiling range conversion will usually improve catalyst performance and permit lower temperatures, higher space velocities, or combinations of these conditions to be employed.

Feedstocks

The feedstock for the present conversion process comprises a heavy hydrocarbon oil, such as a gas oil, coker tower bottoms fraction reduced crude, vacuum tower bottoms, deasphalted vacuum resids, FCC tower bottoms or cycle oils. Oils derived from coal, shale or tar sands may also be treated in this way. Oils of this kind generally boil at about 650° F. (343° C.), although this process is also useful with oils which have initial boiling points as low as 500° F. (260° C.). Typical boiling ranges will be about 650° to 1050° F. (566° C.), or about 650° to 950° F. (510° C.), but oils with a narrower boiling range may, of course, be processed; for example, those with a boiling range of about 650° to 850° F. (454° C.). Heavy gas oils are often of this kind, as are cycle oils and other nonresidual materials.

The composition of a typical gas oil is set forth in Table 1 below. This feed either on its own or with other feeds or feeds of a similar nature may be used in the present process.

TABLE 1

| PROPERTIES OF A SOUR HEAVY GAS OIL | |
|---|---|
| Pour Point, °F. | 90 |
| CCR, wt. % | 0.54 |
| KV @ 40° C. | N/A Waxy |
| KV @ 100° C. | 8.50 |
| Aniline Point, °F. | 170.5 |
| Bromine Number | 8.7 |
| Carbon, wt. % | 87.1 |
| Hydrogen, wt. % | 12.1 |
| Sulfur, wt. % | 2.4 |
| Nitrogen, wt. % | 0.41 |
| Basic Nitrogen, ppm | 382 |
| Nickel, ppm | 0.3 |
| Vanadium, ppm | 0.4 |
| Iron, ppm | 0.3 |

TABLE 1-continued

| PROPERTIES OF A SOUR HEAVY GAS OIL | |
|---|---|
| Copper, ppm | 20 |
| Sodium, ppm | 1.3 |

The method of making the instant zeolite Beta and use on hydrocarbon cracking reactions are illustrated in the following Examples. All parts and proportions in these Examples are by weight unless stated to the contrary. In the examples the product crystallinity is expressed as the ratio of the intensity of the reflection at two theta=22.5°, 27°, 29.6° and 43°-44° to that of a standard sample of crystalline zeolite Beta.

EXAMPLE 1

A commercially available small crystal zeolite Beta having a $SiO_2:Al_2O_3$ ratio of about 32 is used in this example. The chemical composition of the ammonium-exchanged product of this commercially manufactured zeolite Beta is, in wt.%:

| C | 9.8 |
|---|---|
| N | 3.2 |
| Na | 0.05 |
| $Al_2O_3$ | 3.7 |
| $SiO_2$ | 70.5 |
| Ash | 75.4 |
| $SiO_2/Al_2O_3$ | 32 |

A fluid catalyst is prepared by spray drying an aqueous slurry containing 25 wt.% of the foregoing zeolite Beta in a 65% $SiO_2$-$Al_2O_3$ (93/7)/35% clay slurry. The resulting catalyst is ammonium exchanged and dried. The catalyst is steam deactivated at 1450° F. for 10 hours in 45% steam, 55% air at 0 psig.

EXAMPLE 2

The improved zeolite Beta of the instant invention is prepared in accordance with the following procedure.

Colloidal silica (30%), 101.4 parts is added to a solution containing 1 part sodium aluminate (43.3% $Al_2O_3$, 32.2 % $Na_2O$), 55.8 parts of 40% tetraethylammonium hydroxide solution (TEAOH), 64.8 parts of 50% tetraethylammonium bromide solution (TEABr) and 31.5 parts of tetraethylammonium bromide solid. To this is added 17.0 parts of triethanolamine (TEA).

The composition of the reaction mix is as follows, in mole ratios:

| $SiO_2/Al_2O_3$ | = | 119 |
|---|---|---|
| $OH^-/SiO_2$ | = | 0.32 |
| $R_1 + R_2/SiO_2$ | = | 0.90 |
| $H_2O/SiO_2$ | = | 15.0 |
| $Na^+/SiO_2$ | = | 0.02 |
| $TEA/SiO_2$ | = | 0.22 |
| $R_1/R_1 + R_2$ | = | 0.33 | where $R_1$=TEAOH and $R_2$=TEABr.

The mixture is crystallized in a static reactor at 143° C. for 8 days. The solid product is filtered, water washed and dried at 120° C.

The X-ray analysis of the product is zeolite Beta, 115% crystallinity. Scanning electron micrographs of the material show crystals of 0.5-0.75 micron size. The chemical composition of the product is, in wt.%:

| C | 9.69 |
|---|---|
| N | 1.71 |
| Na | 0.45 |
| $Al_2O_3$ | 1.1 |
| $SiO_2$ | 75.6 |
| Ash | 77.7 |
| $SiO_2/Al_2O_3$ | 117 |

The sorption capacities, after calcining for 3 hrs at 538° C. are, in wt.%:

| Cyclohexane, 40 Torr | 21.2 |
|---|---|
| n-Hexane, 40 Torr | 17.9 |
| $H_2O$, 12 Torr | 20.6 |
| Surface area, $m^2/g$ | 600 |

The product of this Example is determined to have the X-ray diffraction pattern shown below:

TABLE 2

| X-ray Diffraction Pattern of Zeolite Beta | | |
|---|---|---|
| 2-Theta | d (Angstroms) | $I/I_o$ |
| 7.58 | 11.65 | 11 |
| 11.66 | 7.58 | 2 |
| 16.64 | 5.32 | 5 |
| 17.88 | 4.96 | 2 |
| 18.34 | 4.83 | 2 |
| 21.58 | 4.11 | 16 |
| 22.61 | 3.93 | 100 |
| 25.46 | 3.50 | 7 |
| 26.85 | 3.32 | 16 |
| 29.04 | 3.07 | 3 |
| 29.61 | 3.01 | 14 |
| 30.68 | 2.91 | 4 |
| 33.57 | 2.67 | 4 |
| 34.68 | 2.58 | 2 |
| 43.90 | 2.07 | 11 |
| 44.63 | 2.03 | 2 |
| 49.90 | 1.83 | 2 |
| 52.66 | 1.74 | 2 |
| 55.22 | 1.66 | 3 |

A fluid catalyst is prepared by spray drying an aqueous slurry containing 15 wt.% of the zeolite Beta of this example in a 65% $SiO_2$-$Al_2O_3$ (93/7)/35% clay slurry. The resulting catalyst is ammonium exchanged and dried. The catalyst is steam deactivated at 1450° F. for 10 hours in 45% steam/55% air at 0 psig.

EXAMPLE 3

Colloidal silica (30%) 84.2 parts is added to a solution containing 1 part sodium aluminate (43.3% $Al_2O_3$, 32.2% $Na_2O$), 73.7 parts $H_2O$, 6.8 parts tetraethylammonium fluoride (TEAF), 33.2 parts 40% tetraethylammonium hydroxide solution (TEAOH) and 10.5 parts triethanolamine (TEA).

The composition of the reaction mixture in mole ratios is as follows:

| $SiO_2/Al_2O_3$ | = | 99 |
|---|---|---|
| $OH^-/SiO_2$ | = | 0.44 |
| $R_1 + R_2/SiO_2$ | = | 0.32 |
| $H_2O/SiO_2$ | = | 20.6 |
| $Na^+/SiO_2$ | = | 0.22 |
| $R_1/R_1 + R_2$ | = | 0.66 |
| $TEA/SiO_2$ | = | 0.17 | where $R_1$=TEAOH and $R_2$=TEAF

The mixture is crystallized in a static reactor at 130° C. for 21 days. The solid product is filtered, water washed and dried at 120° C.

Scanning electron micrographs of the material reveal crystals of 0.3-1.0 micron in size. The X-ray analysis of the product shows it to be zeolite Beta, 110% crystalline, with the characteristic lines shown in Table 3:

TABLE 3

| Interplanar d-Spacing (A) | Relative Intensity ($I/I_o$) |
|---|---|
| 11.5 ± 0.3 | M-S |
| 7.4 ± 0.2 | W |
| 6.6 ± 0.15 | W |
| 4.15 ± 0.1 | W |
| 3.97 ± 0.1 | VS |
| 3.00 ± 0.07 | W |
| 2.05 ± 0.05 | W |

The chemical composition of the product is in wt.%:

| N | = | 1.62 |
|---|---|---|
| Na | = | 0.29 |
| $Al_2O_3$ | = | 2.8 |
| $SiO_2$ | = | 74.5 |
| Ash | = | 79.7 |
| $SiO_2/Al_2O_3$ | = | 45.2 |

EXAMPLE 4

Colloidal silica (30% $SiO_2$), 101.4 parts is added to a solution containing sodium aluminate (1 part), 55.8 parts 40% tetraethylammonium hydroxide (TEAOH) solution, 64.8 parts 50% tetraethylammonium bromide (TEABr) solution, 31.5 parts solid TEABr and 17.0 parts triethanolamine (TEA).

The composition of the reaction mixture in mole ratios is as follows:

| $SiO_2/Al_2O_3$ | = | 119 |
|---|---|---|
| $OH^-/SiO_2$ | = | 0.32 |
| $R_1 + R_2/SiO_2$ | = | 0.90 |
| $R_1/R_1 + R_2$ | = | 0.33 |
| $H_2O/SiO_2$ | = | 15.0 |
| $Na^+/SiO_2$ | = | 0.02 |
| $TEA/SiO_2$ | = | 0.22 | where $R_1$=TEAOH and $R_2$=TEABr

The mixture is crystallized in a static reactor at 140° C. for 8 days.

The X-ray analysis of the washed, dried (120° C.) material was zeolite Beta, 125% crystalline. The material has the characteristic X-ray diffraction shown in Table 2. Scanning electron micrographs show crystals of 0.3-0.5 microns. The chemical composition of the product was, in wt.%:

| N | = | 1.70 |
|---|---|---|
| Na | = | 0.53 |
| $Al_2O_3$ | = | 1.2 |
| $SiO_2$ | = | 75.2 |
| Ash | = | 78.1 |
| $SiO_2/Al_2O_3$ | = | 106 |

The sorption capacities, after calcining for 16 hours at 538° C. are, in wt.%:

| Cyclohexane, 40 Torr | 20.6 |
|---|---|
| n-Hexane, 40 Torr | 18.1 |
| $H_2O$, 12 Torr | 15.5 |
| Surface area, $m_2/g$ | 617 |

EXAMPLE 5

This zeolite Beta is synthesized using a source of precipitated silica in a stirred reactor.

Ultrasil, precipitated silica, 11.5 parts is added to a solution containing 1 part 50% NaOH solution, 40% tetraethylammonium hydroxide (TEAOH) solution, 20.3 parts triethanolamine (TEA) 17.3 parts and $H_2O$, 4.92 parts. To this mixture is added 1.18 parts of zeolite Beta seeds (78% solids, 110/1 $SiO_2/Al_2O_3$. The mixture has the following composition in mole ratios:

| $OH^-/SiO_2$ | = | 0.39 |
|---|---|---|
| $R/SiO_2$ | = | 0.32 |
| $H_2O/SiO_2$ | = | 5.65 |
| $Na^+/SiO_2$ | = | 0.07 |
| $TEA/SiO_2$ | = | 0.67 |

Where R=TEAOH

Any alumina present exists as an impurity in the silica source.

The mixture is crystallized, with stirring, 300 rpm, for 16 hours at room temperature, followed by 10 days at 135° C. The X-ray analysis shows the product to be zeolite Beta, 95% crystalline, with a trace of unidentified crystalline material. The scanning electron micrographs shows the material to be 0.3-0.8 microns in size.

The chemical composition of the product is, in wt.%:

| N | 1.61 |
|---|---|
| Na | 1.1 |
| $Al_2O_3$ | 0.20 |
| $SiO_2$ | 75.5 |
| Ash | 78.4 |
| $SiO_2/Al_2O_3$ | 642 |

The sorption capacities, after calcining for 3 hours at 538° C. are, in wt.%:

| Cyclohexane, 40 Torr. | 13.5 |
|---|---|
| n-Hexane, 40 Torr. | 10.8 |
| $H_2O$, 12 Torr. | 4.9 |
| Surface area, $m_2/g$ | 333 |

A fluid catalyst was prepared by spray drying an aqueous slurry containing 15 wt.% of the zeolite Beta of this example in a 65% $SiO_2$-$Al_2O_3$ (93/7)/35% clay slurry. The resulting catalyst is ammonium exchanged and dried. The catalyst is steam deactivated at 1450° F. for 1 hours in 45% steam/55% air at 0 psig.

The unexpected benefit of treating the zeolite Beta of this invention with a phosphorus compound is illustrated by the following example:

EXAMPLE 6

Dried 106/1 $SiO_2/Al_2O_3$ zeolite Beta crystals are prepared in accordance with Example 4. A slurry containing 150 g of the dried 106/1 $SiO_2O_3$ zeolite Beta crystals and·0.9 g of Maraspere N-22 dispersant (Reed-Lignin, Inc.) are diluted to 33% solids with deionized water and ball-milled for 16 hours in a one gallon porcelain ballmill containing agate stones. After ball-milling, the slurry is recovered; rinse water is added to the slurry to reduce the solids content to 20 wt.%. 2043.6 g of a kaolin slurry is prepared containing 781.4 g of kaolin. An H solution is prepared by adding 109.8 grams of 86.1% H to 789.6 g of deionized water. The H solution is added to the zeolite slurry over a 15 minute period. The pH of the phosphoric acid-treated zeolite slurry is 1.6. Next, the phosphoric acid/zeolite slurry is added to the kaolin slurry over an 11 minute period with stirring. After stirring for an additional 15 minutes, 400.5 g of deionized water are added; the pH is 1.8. Deionized water is added to adjust the solids percent of the slurry to 25%. After homogenization, the slurry is spray dried. The resulting catalyst is calcined for 3 hours at 1200° F. in air. The catalyst is steam-deactivated at 1450° F. for 10 hours in 45% steam, 55% air at 0 psig.

additive concentration of 1 wt.% with the REY-type catalyst (Catalyst A). This catalyst is designated as Catalyst E.

EVALUATION OF CATALYSTS A, B, C, D AND E

Catalysts A, B, C, D and E were evaluated for their cracking ability of a Sour Heavy Gas Oil (having the specifications as detailed in Table 1) in a fixed, fluidized-bed (FFB) unit at 960° F. over a range of catalyst/oil ratios. The performance of these catalysts (at 65 vol.% conversion) were determined via interpolation, the performance results were presented in Table 4. Catalyst C was evaluated on three separate occasions, while Catalyst D was evaluated on two occasions. As the data indicate, both catalysts consistently exhibited good performance characteristics.

TABLE 4

| Catalyst | A | B | ←C→ | | ←D→ | | ←E→ |
|---|---|---|---|---|---|---|---|
| Conversion, vol % | | | ←65→ | | | | |
| Coke, wt. % | 4.7 | 4.6 | 4.4 | 4.8 | 4.4 | 4.1 | 4.2 | 5.1 |
| $C_1$-$C_3$, wt % | 7.6 | 8.3 | 8.9 | 9.7 | 10.0 | 8.7 | 9.1 | 8.1 |
| $C_4$'s, wt % | 7.9 | 8.2 | 10.2 | 9.4 | 10.0 | 8.3 | 8.6 | 8.2 |
| $C_5^+$ Gasoline, wt % | 42.1 | 40.9 | 38.4 | 38.2 | 37.7 | 41.0 | 40.4 | 41.0 |
| HFO + LFO, wt % | 37.6 | 37.6 | 37.8 | 37.6 | 37.8 | 37.9 | 37.7 | 37.6 |
| LFO, wt % | 29.1 | 28.1 | 28.8 | 28.7 | 29.0 | 28.1 | 28.2 | 28.7 |
| HFO, wt % | 8.5 | 9.5 | 9.0 | 8.9 | 8.8 | 9.8 | 9.5 | 8.9 |
| RON | 91.0 | 92.0 | 93.1 | 92.9 | 92.6 | 92.0 | 92.1 | 91.7 |
| $C_5^+$ Gasoline, vol % | 50.7 | 49.4 | 46.1 | 45.8 | 45.0 | 49.5 | 48.9 | 49.2 |
| $C_4^=$ + $C_3^=$ + $iC_4$, vol % | 18.0 | 19.1 | 23.5 | 22.5 | 24.8 | 20.4 | 21.3 | 17.8 |
| Δ RON | | 1.0 | 2.1 | 1.9 | 1.6 | 1.0 | 1.1 | 0.7 |
| −Δ $C_5^+$ Gasoline, vol % | | 1.3 | 4.6 | 4.9 | 5.7 | 1.2 | 1.8 | — |
| Δ $C_4^=$ + $C_3^=$ + $iC_4$, vol % | | 1.1 | 5.5 | 4.5 | 6.8 | 2.4 | 3.3 | — |
| Δ RON/wt % zeolite Beta | | 0.3 | 0.7 | 0.6 | 0.5 | 0.3 | 0.4 | 0.7 |
| −Δ $C_5^+$ gasoline/Δ RON | | 1.3 | 2.2 | 2.6 | 3.6 | 1.2 | 1.6 | — |
| Δ $C_4^=$ + $C_3^=$ + $iC_4$, vol %/ wt. % zeolite Beta | | 0.4 | 1.8 | 1.5 | 2.3 | 0.8 | 1.1 | — |

CATALYST A

A base catalyst employed in the present study is a commercially available, REY-type catalyst which is removed from a commercial FCC unit following oxidative regeneration. The regenerated REY catalyst is designated as Catalyst A.

CATALYST B

The commercially available small crystal zeolite Beta catalyst of Example 1 is blended to an additive concentration of 3 wt.% with the REY-type zeolite (Catalyst A). This catalyst is designated as Catalyst B.

CATALYST C

The steamed large crystal zeolite Beta catalyst of the instant invention synthesized as described in Example 2 is blended to an additive concentration of 3 wt.% with the REY-type zeolite (Catalyst A). This catalyst is designated as Catalyst C.

CATALYST D

The phosphorus-treated large crystal zeolite Beta catalyst synthesized as described in Example 6 is blended to an additive concentration of 3 wt.% with the REY-type catalyst (Catalyst A). This catalyst is designated as Catalyst D.

CATALYST E

The steamed large crystal zeolite Beta catalyst synthesized as described in Example 5 is blended to an The performance results, reported in Table 4, show that catalyst C increased production of $C_3$ and $C_4$ olefins and $iC_4$ and exhibited an increased activity for octane enhancement as compared to catalysts A and B. Although it is expected that the different acidity influences catalytic activity, the spatial distribution of aluminum in the larger crystal zeolite should influence the selectivity since the diffusion path length must play a significant role in the conversion reactions. The additional loss in $C_5+$ gasoline is offset by the increased production of gasoline and alkylate. The increase in octane gain and light olefins is beneficial to refiners with olefin processing capabilities.

Catalyst D, the phosphorus-treated zeolite Beta, reduces octane gain, i.e. is less active for octane enhancement than C (Δ RON/wt%) but is more selective (−Δ$C_5^+$ gasoline/Δ RON), than catalyst C. The phosphorus-treated zeolite Beta catalyst D exhibits comparable selectivity (−Δ$C_5^+$ gasoline/ A RON) as catalyst B. However, the advantage of phosphorus treatment is that catalyst D is a large crystal zeolite Beta which is more hydrothermally stable than the smaller crystal zeolite, catalyst B.

Conclusively, catalyst C is preferred for refineries with $C_3/C_4$ olefin processing capabilities. Yet treatment of this catalyst with a source of phosphorus as exemplified by catalyst D allows the catalyst to be useful in refineries with limited $C_3/C_4$ olefin processing capabilities.

The performance results show that Catalysts B and E exhibit similar activity for octane enhancement. However, it will be noted that Catalyst E contains only 1 wt.% of the large crystal zeolite Beta while Catalyst B contains 3 wt.% of the smaller crystal zeolite Beta, thus, smaller amounts of the large crystal zeolite Beta are effective making it an economically more advantageous alternative. Olefin production with catalyst E is reduced over catalyst B which is attributed to the higher silica-to-alumina ratio of the larger crystal material.

We claim:

1. A catalytic cracking process comprising contacting a hydrocarbon feed in the absence of added hydrogen to produce gasoline and olefins with a cracking catalyst comprising zeolite Beta which is substantially free of amorphous materials, synthesized by preparing a reaction mixture which contains at least one source of alkali metal cation, at least one organic cation, a chelating agent, an oxide of silicon, water and an oxide of aluminum and having a composition in terms of mole ratios within the following ranges:

| | |
|---|---|
| $SiO_2/Al_2O_3$ = | 20–>1000 |
| $OH^-/SiO_2$ = | 0.1–0.8 |
| $R/SiO_2$ = | 0.3–1.0 |
| $H_2O/SiO_2$ = | 5–40 |
| $M/SiO_2$ = | 0.01–0.2 |
| $X/SiO_2$ = | 0.1–1.0 | where R is the organic cation, M is the alkali metal cation and X is the chelating agent, maintaining the reaction mixture under conditions sufficient to crystallize the silicate; recovering the zeolite Beta, the recovered zeolite containing the organic cation and the chelating agent.

2. The cracking process of claim 1 in which the zeolite Beta has a crystal size ranging from 0.1–3.0 microns as determined by scanning electron micrographs.

3. The cracking process of claim 1 in which the chelating agent is a nitrogenous organic reactant.

4. The cracking process of claim 3 in which the chelating agent is a tertiary alkanolamine.

5. The cracking process of claim 4 in which the chelating agent is triethanolamine, triisopropanolamine and 2,2-Bis(hydroxymethyl)-2,2'2''-nitrilotriethanol.

6. The cracking process of claim 1 comprising replacing the alkali metal ions of the crystalline silicate at least in part with a cation or a mixture of cations selected from the group comprising hydrogen and hydrogen precursors, rare earth metals and metals from Groups IIA, IIIA, IVA, IIIB, IVB, VIB, VIIB or VIII of the Periodic Table of the Elements.

7. The cracking process of claim 1 in which the zeolite Beta synthesis conditions include temperatures ranging from 70° C. to 175° C.

8. The cracking process of claim 1 in which the source of oxide of silicon is a colloidal silica, precipitated silica or silica precursor.

9. The cracking process of claim 8 in which the source of oxide of silicon is a precipitated silica or silica precursor and the reaction mixture further comprises crystalline zeolite Beta seeds.

10. The cracking process of claim 9 in which the crystalline seeds have a silica-to-alumina mole ratio of at least 70.

11. A process for catalytic cracking of a hydrocarbon feed in the absence of added hydrogen to produce gasoline and light olefins with a catalyst system comprising a circulating hot cracking component and a zeolite Beta catalyst which is substantially free of amorphous materials, and having the structure of zeolite Beta prepared by:

a. preparing a reaction mixture which contains at least one source of alkali metal cation, at least one organic cation, a chelating agent, an oxide of silicon, water and an oxide of aluminum and having a composition in terms of mole ratios within the following ranges:

| | |
|---|---|
| $SiO_2/Al_2O_3$ = | 20–>1000 |
| $OH^-/SiO_2$ = | 0.1–0.8 |
| $R/SiO_2$ = | 0.3–1.0 |
| $H_2O/SiO_2$ = | 5.0–40 |
| $M/SiO_2$ = | 0.01–0.2 |
| $X/SiO_2$ = | 0.1–1.0 | where R is the organic cation, M is the alkali metal cation and X is the chelating agent;

b. maintaining the reaction mixture under conditions sufficient to crystallize the silicate; and c. recovering the zeolite Beta from step (b), the recovered zeolite containing the organic cation and the chelating agent.

12. The process of claim 11 in which the chelating agent is a tertiary alkanolamine selected from the group consisting of triethanolamine, triisopropanolamine and 2,2-Bis(hydroxymethyl)-2,2'2''-nitrilotriethanol.

13. The process of claim 11 in which the method comprises replacing the alkali metal ions of the crystalline silicate recovered in step (b) at least in part by ion exchange with a cation or a mixture of cations selected from the group comprising hydrogen and hydrogen precursors, rare earth metals and metals from Groups IIA, IIIA, IVA, IIIB, IVB, VIB, VIIB or VIII of the Periodic Table of the Elements.

14. The process of claim 11 in which the circulating hot cracking component comprises a molecular sieve.

15. The process of claim 14 in which the molecular seive is faujasite.

16. The process of claim 15 in which the faujasite is REY, USY, RE-USY, dealuminated Y, silicon-enriched dealuminated Y and blends thereof.

17. The process of claim 14 in which the molecular sieve is ZSM-5.

18. A process of catalytic cracking of a feedstock comprising contacting the feedstock with a catalyst system including a molecular seive zeolite Beta which is substantially free of amorphous materials prepared by:

a. preparing a mixture which contains at least source of alkali metal cation, at least one source of organic cation, a chelating agent, an oxide of silicon, water and an oxide of aluminum and having a composition in terms of mole ratios within the following ranges:

| | |
|---|---|
| $SiO_2/Al_2O_3$ = | 20–>1000 |
| $OH^-/SiO_2$ = | 0.1–0.8 |
| $R/SiO_2$ = | 0.3–1.0 |
| $H_2O/SiO_2$ = | 5–40 |
| $M/SiO_2$ = | 0.01–0.2 |
| $X/SiO_2$ = | 0.1–1.0 | where R is the organic cation, M is the alkali metal cation and X is the chelating agent;

b. maintaining the reaction mixture at conditions sufficient to crystallize the silicate; and c. recovering the crystalline silicate from step (b), the recovered silicate containing the organic cation and the chelating agent.

19. The process of claim 18 which further comprises treating the catalyst system with a source of phosphorus.

20. The process of claim 19 in which the source of phosphorus is selected from the group consisting of phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite or mixtures thereof.

21. The process of claim 19 in which the catalyst system includes a slurry of the large crystal zeolite Beta and a clay slurry and a source of phosphorus is included in at least one of the slurries.

22. The process of claim 21 in which the catalyst system includes a zeolite Beta slurry, a first clay slurry and a second clay slurry, and the source of phosphorus is included in at least one of the slurries, mixing at least a portion of the slurries and spray-drying the slurry mixture at a pH of $\leq 3$.

23. The process of claim 22 in which the first clay slurry is a kaolin clay, the second clay slurry is ball clay and the source of phosphorus is phosphoric acid.

24. The process of claim 22 in which the first clay slurry comprises a first clay with a first average particle size; the second clay slurry comprises a second clay with a second average particle size which is less than said first average particle size.

25. The process of claim 24 in which the first average particle size is 0.2 to 20 microns, and the second average particle size is 0.2 to 10 microns.

26. The process of claim 21 in which the catalyst system is prepared by contacting one of the slurries with a source of phosphorus for less than 30 minutes.

27. The process of claim 19 in which the catalyst system includes a cracking component which is another molecular sieve.

28. The process of claim 27 in which the other molecular sieve is a faujasite-type catalyst which is REY, USY, dealuminated Y, silicon-enriched dealuminated Y and blends thereof or ZSM-5.

29. A catalytic cracking process comprising contacting a hydrocarbon feed in the absence of added hydrogen to produce gasoline and olefins with a cracking catalyst comprising a fully crystalline zeolite Beta having the as-synthesized composition identified in terms of mole ratios of oxides in the anhydrous state:

(3 to 60)$R_2O$ :(0.5 to 12) $M_{2/n}O$:$Al_2O_3$:(20 to >1000) $SiO_2$ where M is an alkali metal cation of valence n and R represents the organic cation and the chelating agent.

30. The cracking process of claim 29 in which the as-synthesized composition is exchanged at least in part into a hydrogen form of the zeolite by calcining and exchange of the alkali metal cations.

31. The process of claim 1 in which the organic cation is a tetraethylammonium cation.

32. The process of claim 31 in which the tetraethylammonium cation is selected from the group consisting of tetraethylammonim hydroxide or halide.

33. The process of claim 32 in which the halide of the tetraethylammonium halide is chloride, bromide or fluoride.

34. The process of claim 11 in which the organic cation is a tetraethylammonium cation.

35. The process of claim 34 in which the tetraethylammonium cation is selected from the group consisting of tetraethylammonium hydroxide or halide.

36. The process of claim 35 in which the halide of the tetraethylammonium halide is chloride, bromide or fluoride.

37. The process of claim 18 in which the organic cation is a tetraethylammonium cation.

38. The process of claim 37 in which the organic cation is a tetraethylammonium cation.

39. The process of claim 38 in which the halide of the tetraethylammonium halide is chloride, bromide or fluoride.

* * * * *

UNITED STATES PATENT AND TRADEMARK OFFICE
CERTIFICATE OF CORRECTION

PATENT NO. : 5,232,579

DATED : August 3, 1993

INVENTOR(S) : R.P.L. Absil, J. A. Herbst, J. A. Kowalski & M. K. Rubin

It is certified that error appears in the above-identified patent and that said Letters Patent is hereby corrected as shown below:

Col. 19, line 25, claim 22, Replace "$\leqq$" with --$\leq$--

Col. 20, line 3, claim 28, After "USY" insert --REUSY--

Col. 20, line 37, claim 38, Rewrite claim 38 to read
--The process of claim 37 in which the tetraethylammonium cation is selected from the group consisting of tetraethylammonium hydroxide or halide.--

Signed and Sealed this

Twenty-fourth Day of May, 1994

Attest:

BRUCE LEHMAN

*Attesting Officer*  *Commissioner of Patents and Trademarks*